(12) United States Patent
Langley et al.

(10) Patent No.: US 7,609,712 B2
(45) Date of Patent: Oct. 27, 2009

(54) FREQUENCY OFFSET DIFFERENTIAL PULSE POSITION MODULATION

(76) Inventors: John B. Langley, 225 Eagle Trace Dr., Half Moon Bay, CA (US) 94018; Michael Mancusi, 658 Island Pl., Redwood City, CA (US) 94065

( * ) Notice: Subject to any disclaimer, the term of this patent is extended or adjusted under 35 U.S.C. 154(b) by 310 days.

(21) Appl. No.: 11/504,967

(22) Filed: Aug. 15, 2006

(65) Prior Publication Data

US 2007/0110149 A1 May 17, 2007

Related U.S. Application Data

(63) Continuation of application No. 10/762,197, filed on Jan. 20, 2004, now Pat. No. 7,180,850, which is a continuation of application No. 09/500,750, filed on Feb. 8, 2000, now Pat. No. 6,711,122.

(60) Provisional application No. 60/119,225, filed on Feb. 8, 1999.

(51) Int. Cl.
*H04L 12/56* (2006.01)
*H04J 1/16* (2006.01)

(52) U.S. Cl. ........... 370/445; 370/230

(58) Field of Classification Search ......... 370/230–240, 370/278, 282, 445, 448, 462; 709/253
See application file for complete search history.

(56) References Cited

U.S. PATENT DOCUMENTS

| 3,626,379 A | 12/1971 | Wrigley |
| 4,151,407 A | 4/1979 | McBride et al. |
| 4,206,316 A | 6/1980 | Burnsweig et al. |
| 4,553,101 A | 11/1985 | Mathis |
| 4,608,559 A * | 8/1986 | Friedman et al. ............ 370/462 |
| 4,752,939 A | 6/1988 | Amoroso et al. |
| 5,084,891 A | 1/1992 | Ariyavisitakul et al. |
| 5,394,410 A | 2/1995 | Chen |
| 5,487,069 A | 1/1996 | O'Sullivan |
| 5,577,026 A | 11/1996 | Gordon et al. |
| 5,781,538 A | 7/1998 | Ganesan et al. |
| 5,799,045 A | 8/1998 | Sakuma et al. |
| 5,805,632 A | 9/1998 | Leger |
| 5,926,301 A | 7/1999 | Hirt |

(Continued)

OTHER PUBLICATIONS

Analog And Digital Communication Systems; Martin S. Roden, Dept. of Electrical and Computer Engineering, California State University, Los Angeles, Fourth Edition. Prentice Hall, Upper addle River, NJ 07458.

*Primary Examiner*—John Pezzlo

(57) ABSTRACT

The present invention provides such a need by utilizing a frequency offset differential pulse position modulation scheme to transmit data between computing devices within a wireless network system. The differential pulse position modulation component of the scheme enables the present invention to provide relative immunity to interference for the system. In particular, such immunity from interference is achieved by utilizing a blanking time between pulse positions, which is large enough to allow the interference between frequency offset—differential pulse position modulation pulses to subside. The frequency offset component of the scheme enables the system to utilize multiple frequency channels to enable the system to achieve higher data rates. In particular, by utilizing a time offset between the frequency channels, the blanking time can be reduced, thereby increasing the amount of data that can be transmitted with a set period of time.

22 Claims, 12 Drawing Sheets

U.S. PATENT DOCUMENTS

| | | |
|---|---|---|
| 6,055,266 A | 4/2000 | Nakamura |
| 6,055,578 A * | 4/2000 | Williams et al. ............ 709/253 |
| 6,078,591 A * | 6/2000 | Kalkunte et al. ............ 370/448 |
| 6,421,333 B1 | 7/2002 | Jalali |
| 6,937,617 B2 | 8/2005 | Rakib et al. |
| 2004/0095898 A1 | 5/2004 | Betts |

* cited by examiner

FREQUENCY OFFSET DIFFERENTIAL PULSE POSITION MODULATION

RELATED APPLICATION

This application is a continuation of U.S. application Ser. No. 10/762,197, filed Jan. 20, 2004 now U.S. Pat. No. 7,180,850, and entitled "Frequency Offset Differential Pulse Position Modulation", which is a continuation of U.S. application Ser. No. 09/500,750, filed on Feb. 8, 2000, and entitled "Frequency Offset Differential Pulse Position Modulation, now U.S. Pat. No. 6,711,122, which claims the benefit under 35 U.S.C. .sctn. 119(e) of U.S. Provisional Application Ser. No. 60/119,225, filed on Feb. 8, 1999, and entitled "Frequency Offset Differential Pulse Position Modulation Scheme".

BACKGROUND OF INVENTION

1. Field of Technology

The present invention generally relates to computer networks and, more particularly, to wireless networking.

2. Description of Related Art

Throughout the 1980s, local area networks ("LANs") emerged as a new technology market. Aided by technology that allowed LANs to operate over the structured unshielded twisted pair telephone wire already installed in most buildings, the networking market has become a $7 billion a year business. Unfortunately, as organizations grow more dependent on these high speed LANs, structured wiring systems have become less palatable. Current LANs are highly dynamic, marked by constant moves, additions and configuration changes to keep the system operating at peak performance. As a result, operating and maintenance costs are growing as users attempt to keep pace with this rapidly evolving environment. Typically, more than 60 percent of conventional LAN reconfiguration costs are attributable to labor, with the percentage much higher in metropolitan areas where labor is more expensive. For example, a conventional high speed LAN (e.g. a 30 node LAN) typically requires an average of three weeks to plan and install. In addition, more than 35 percent of problems with LANs using hubs and structured wiring and 70 percent of problems with LANs without hubs and structured wiring typically are attributable to the cabling of the LAN. In particular, the costs to move an average Ethernet unshielded twisted pair ("UTP") connection of such a LAN average approximately $500 or more (in parts and labor) per node. This cost further increases in major metropolitan areas where increased labor costs and a prevalence of fiber-based LANs exist.

In the early 1990s, an alternative to wired LANs was the wireless LAN ("WLAN"). The benefits of this wireless communication technique in such an environment relates to the avoidance of much of the costs associated with the cabling of the network. However, most of these WLAN products failed to meet several key criteria essential to wide-scale adoption. The system failed to be fast (e.g. at least 10 Megabits per second), was not simple (e.g. plug and play) and was not economical (e.g. less than $500 per node).

In a manner analogous to the growth of the wired LANs, initial application and market success of the WLAN was in specialized, vertical markets. Thus, applications that highly valued the mobile, untethered connectivity were the early targets of the WLAN industry. Over the last two years, however, WLANs began to emerge as an option to fill an ever-widening gap in the corporate enterprise infrastructure. Currently, there are three basic types of wireless networks: wide-area network ("WAN"), local area networks ("LAN") and campus area networks ("CAN").

These WLANs, however, exhibit one drawback or another such as being too slow, restricted to certain environments or too expensive. In an ideal environment, the optimal WLAN solution would eliminate these shortcomings and exhibit the characteristics of being easy to install, having performance of over 10 Megabits per second ("Mbps"), being cost effective and being compatible with existing Ethernet networking equipment. Unfortunately conventional WLANs do not meet more than a few of these requirements with some failing to satisfy even one.

Today's fourth generation ("4G") of WLAN technology attempts to resolve these problems as well as increase bandwidth and avoid the interference associated with the more crowded lower frequency bands by operating within the 5 GHz frequency band. This increase in frequency enables such 4G WLANs to operate at data rates of approximately 10 Mbps. Such WLANs typically operate in the 5.775-5.850 GHz Industrial, Scientific, and Medical ("ISM") band as well as within frequency bands at 5.2 GHz and 5.3 GHz, Unlicensed-National Information Infrastructure (U-NII) bands. These three segments have been designated by the FCC as exclusively for high speed data transmission. Unlike the lower frequency bands used in prior generations of WLANs, the 5 GHz bands do not have a large number of potential interferors, such as microwave ovens or industrial heating systems. In addition, there is much more bandwidth available at 5 GHz-350 MHz as compared to the 83 MHz within the 2.4 GHz band and the 26 MHz within the 900 MHz band. This combination of greater available bandwidth and reduced sources of interference makes the 5 GHz bands a desirable frequency range in which 4G WLANs have performance comparable to that achieved by wired networks.

Unfortunately, multipath interference, or Rayleigh fading, occurs when radio waves reflect off the surface of physical objects, producing a complex pattern of interfering waves which causes signals to meet at the antenna and cancel each other out. In addition, further interference is generated by other devices, which operate in the 2.4 GHz frequency range. These forms of interference present a design challenge for conventional WLAN systems, which have resulted in many conventional 3G WLANs relying upon a spread spectrum scheme. Unfortunately, by overcoming this interference with spread spectrum technology, such as Frequency Hopping Spread Spectrum ("FHSS") and Direct Sequence Spread Spectrum ("DSSS"), these 4G WLANs are limited to data rates of up to 1 Mbps to 2 Mbps.

While FHSS and DSSS. at first, may appear to be simpler to implement than other schemes, there still are some very subtle difficulties that occur when strong interfering signals exist in such a system. For example, the basis of the noise immunity within a DSSS-based system is the fact that the desired signal and interference (or noise) are uncorrelated. In complex interference environments, which are becoming more common as usage increases, particularly ones in which very strong signals may be present, non-linearities in the receiver generate intermodulation ("IM") distortion products between the desired signal and the interfering signals. These IM products now are correlated with the desired signal, thus reducing the resulting signal to noise ratio when processed in the receiver. Therefore, even though the use of spread spectrum techniques combined with more available bandwidth and more complex modulation schemes allows such WLANs to operate at higher data rates, those data rates are not as high as desired (e.g. over 10 Mbps).

Therefore, there currently is a need for a WLAN system, which can achieve higher data rates while still maintaining relative immunity to interference, such as multipath propagation interference.

DISCLOSURE OF INVENTION

Accordingly, the present invention provides such a need by utilizing a frequency offset differential pulse position modulation scheme to transmit data between computing devices within a wireless network system (100). The differential pulse position modulation component of the scheme enables the present invention to provide relative immunity to interference for the system (100). In particular, such immunity from interference is achieved by utilizing a blanking time between pulse positions, which is large enough to allow the interference between pulses to subside and not interfere with the quality of the data transmission. The frequency offset component of the scheme enables the system to utilize multiple frequency channels to enable the system (100) to achieve higher data rates. In particular, by utilizing a time offset between the frequency channels, between which the system switches, the blanking time can be reduced, thereby increasing the amount of data that can be transmitted within a set period of time in the system (100).

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF PREFERRED EMBODIMENTS

Embodiments of the present invention are now described with reference to the Figures where like reference numbers indicate identical or functionally similar elements and the left most digit(s) of each reference number corresponds to the Figure in which the reference number is first used.

Figure 1:
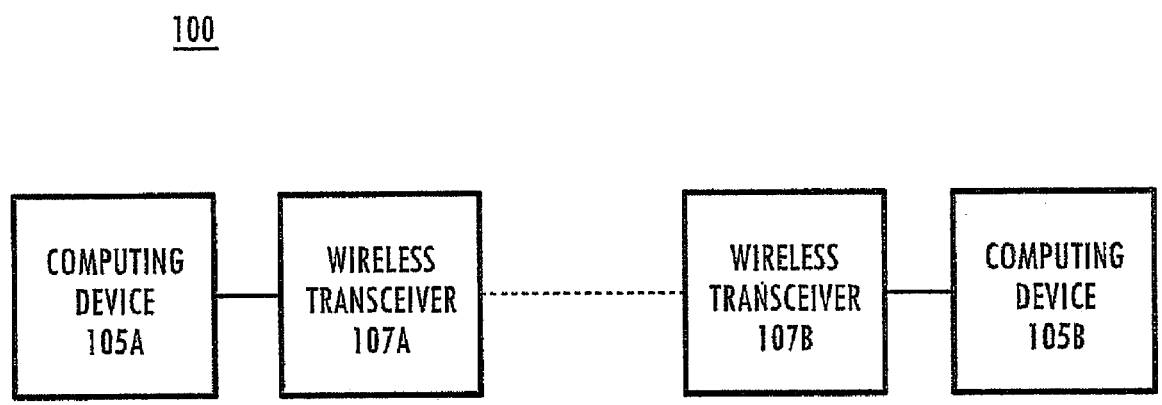
FIG. 1 is an illustration of an overview of a block diagram of a wireless system of an embodiment of the present invention.

FIG. 1 illustrates a WLAN system 100 of an embodiment of the present invention. The system 100 includes a computing device 105A, a wireless transceiver 107A, a wireless transceiver 107B and a computing device 105B. Computing device 105A is coupled to wireless transceiver 107A, which together serve as a node on WLAN system 100. Computing device 105B is coupled to wireless transceiver 107B and together represent a second node on the network system 100. Computing device 105A communicates with computing device 105B by utilizing wireless transceiver 107A to transmit radio frequency ("RF") frequency offset differential pulse position modulation ("FO-DPPM") signals to wireless transceiver 107B, which is coupled to computing device 105B. In one embodiment of the present invention, computing devices 105A and 105B can be an Intel-based (e.g. Pentium III) personal computers or handheld computing devices, such as a Palm Pilot-type devices, from such companies as Palm Computing (e.g., Palm Pilot), Handspring (e.g., Visor) and Microsoft (e.g., Windows CE devices). In addition, transceiver 107A communicates directly with transceiver 107B or indirectly via a wireless network router (e.g., Ethernet router with wireless FO-DPPM capability). One skilled in the art, however, will recognize that system 100 can be modified in numerous additional configurations to maximize the use of the FO-DPPM scheme within system 100. For example, one skilled in the art will recognize that FO-DPPM can be used with any type of wireless scheme including with different frequencies as well as with different network protocols. In addition, the computing devices 105A and 105B can be any type of electronic device, which can manage and/or display electronic data. Furthermore, the number of nodes, which include a computing device 105 and a transceiver 107, is not limited.

The wireless RF scheme of an embodiment of the present invention implements the network issues that are specified by the IEEE 802.3 standard that are not collision related. The wireless protocol also borrows several concepts from the IEEE 802.11 standard. The three phases of the RF wireless MAC are CSMA/CA/ACK phases. The CSMA phase as with the Ethernet, each node in the network 100 monitors the RF media constantly for activity prior to commencing its own transmission. A node does not attempt to transmit when the media is sensed to be busy. In addition, each node in the network 100 is assessing when the media was last released, to determine when Inter-packet Gap ("IPG") expires.

In the CSMA phase, the MAC protocol takes two actions depending upon whether or not carrier is present when a frame is available for transmit. In the event media is busy when a frame is ready for transmission, the node defers until the on-going transmission finishes. Once the ongoing transmission finishes, all nodes with traffic to send compute the time of their next transmission attempt by waiting the IPG time plus a randomized interval (e.g., a random multiple of access-slot time). Should the media become busy again before the node's scheduled transmit time, a new transmit schedule is computed based upon when the new transmission finishes plus the another randomized interval. The subsequent randomized interval are not correlated in any manner, however, as this process repeats the upper bound for the randomization interval grows. If the media is unoccupied when a new frame is available for transmit, a node waits out the IPG if any and then performs the randomization process.

In the CA phase, the MAC protocol waits the randomized interval. The randomized interval is based on the units of access-slot time. Access-slot time can be defined such that all nodes in the network 100 can see each other's traffic within this unit of time. Therefore, randomized multiple of this time unit will differ in a such a way that unless nodes pick the same number of time units, they can see each other's traffic before attempting to transmit and causing collision. The access-slot time also can be considered the collision window in Ethernet terminology. Elements of the access-slot time to consider are 1) transmit turn-on time; 2) medium propagation time and 3) carrier busy detect. The MAC protocol besides randomizing the access to the media also deploys a linear back off algorithm in dynamically expanding the randomization window based on the media availability or lack thereof. Note that this linear back off is different from the retransmit back-off algorithm explained below.

In the ACK phase, the MAC protocol waits to receive the acknowledgement packet once the IPG time elapses. The node that sends the acknowledgement packet will not try the randomization process, which guarantees that, acknowledge packet is sent unless a hidden node does not hear the carrier sense and violates the CA protocol. In the ACK phase, different timeouts are employed to make sure a retransmission can be scheduled once the acknowledgement is not received. The MAC protocol retransmission can follow the IEEE 802.3 back-off algorithm. The slot time used in the back-off algorithm is a network level quantum of time and is called retransmit-slot time.

Figure 2:
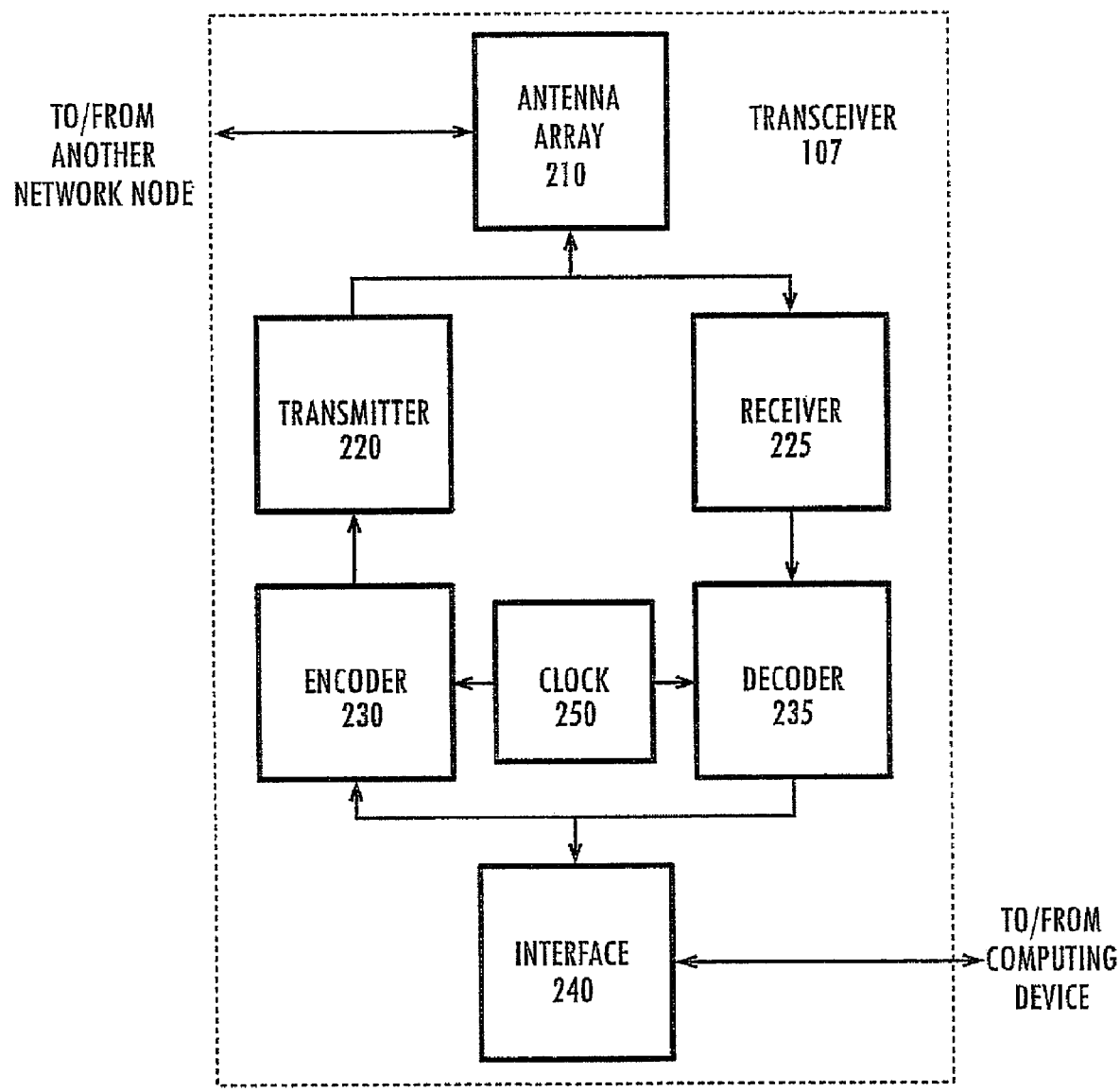
FIG. 2 is an illustration of an overview of a block diagram of a transceiver of an embodiment of the present invention.

FIG. 2 illustrates a transceiver 107 of an embodiment of the present invention. Transceiver 107 includes a transmitter 220, an encoder 230, a receiver 225, a decoder 235, a clock 250, an interface 240 and an antenna array 210. Computing device 105 is coupled to interface 140, thereby allowing one computing device (e.g., 105A) to communicate with another computing devices (e.g., 105B) within the system 100.

The antenna array 210, which is coupled to transmitter 220 and to receiver 225, receives FO-DPPM signals from another antenna array. In one embodiment, the antenna array 210 is a dual antenna configuration and receives single narrow-band frequency (e.g. 5 GHz frequency band) signals. By utilizing a dual antenna configuration, antenna array 210 has spatial diversity between the antennas, which reduces noise and multipath interference that exist within system 100. For example, if one antenna of the antenna array 210 is experiencing fading, the transceiver 107 automatically can switch the receiving of the RF signals to the other antenna within the array 210. Because such high frequencies (e.g. 5.8 GHz frequency) have a short wavelength, these two antennas can reside within one radio antenna assembly without significantly increasing the size of the overall transceiver 107. When antenna array 210 is used at low power consumptions (e.g. using 500 milliwatts or less of power), the antenna array 210 also complies with the low power rules of the Federal Communication Commission ("FCC") Part 15 (unlicensed), subpart 249. Receiver 225 is coupled to antenna array 210 to receive FO-DPPM signals from the antenna array 110. Receiver 225 utilizes an envelope detection scheme to convert the FO-DPPM signal from RF signals, which are received by the antenna array 210, to electrical signals. By merely using the amplitude of the signal to encode the information within the FO-DPPM data stream, no information is encoded in the frequency or phase of the signal. Therefore, minimal requirements exist for maintaining phase noise and frequency stability in the receiver 225 to detect the FO-DPPM signals. Rather, the receiver 225 merely needs to be sufficiently stable to be able to detect the desired pulsed signals within the specific passband frequency channels.

Transmitter 220 is coupled to antenna array 210 and converts FO-DPPM signals from electrical to RF signals, which then are transmitted via antenna array 210 for propagation over the system 100. Transmitter 220 also utilizes the envelope detection scheme to encode the FO-DPPM signals, which are received from the encoder 230, to convert the electrical signals into RF signals. By transmitting the signal based upon the amplitude of the signal, no information needs to be encoded in the frequency or phase of the signal, thereby minimizing the requirements for phase noise and frequency stability. The frequencies of the transmitter 220, therefore, merely need to be sufficiently stable to transmit the desired FO-DPPM signal within the proper passband frequency channel.

The receiver 225 and transmitter 220 also utilize a carrier-sense protocol, similar to Ethernet (IEEE 802.3), to ensure that the FO-DPPM signals are effectively transmitted and received. When the carrier-sense mechanism determines that the transmission (e.g., RF) medium is busy, the transmitter 220 halts for a short, random back-off period after the medium becomes available before attempting to resend. A conventional access protocol (e.g., IEEE 802.3) or back-off algorithm (e.g., Ethernet) can be used to ensure that all nodes have access to all other nodes on the system 100. The data is transmitted in frames or packets in a similar manner to that of Ethernet. Each data packet includes a header, which prepends a standard Ethernet packet, to allow the packet to be transmitted via RF signals. In addition, special maintenance packets can be transmitted to permit dynamic configuration and control of the system 100. Furthermore, an acknowledgment-based protocol also can be implemented to ensure a reliable link transmission. To enable compatibility between different versions of FO-DPPM as well as variations in the transmission protocols, receiver 225 analyzes the protocol version frame of the preamble of the first data packet of a data stream. Based upon this version information contained within the version frame of the preamble of the first data packet, receiver 225 can adjust such aspects of its configuration, such as increasing or decreasing the number of frequency channels that the FO-DPPM signals will be encoded upon.

The encoder 230, which is coupled to interface 240, transmitter 220 and clock 250, receives binary data, which is received via interface 240 from computing device 105, and converts and transmits FO-DPPM signals via transmitter 220 to antenna array 210. The conversion of the binary data to FO-DPPM signals will be discussed in more detail with regard to FIGS. 5A and 5B. The decoder 235, which is coupled to interface 240, receiver 225 and clock 250, receives electrical FO-DPPM signals from receiver 225 and converts the FO-DPPM signals to binary data, which are transmitted via interface 240 to computing device 105. The conversion of the FO-DPPM signals to binary data will be discussed in more detail in FIGS. 6A and 6B.

Figure 3:
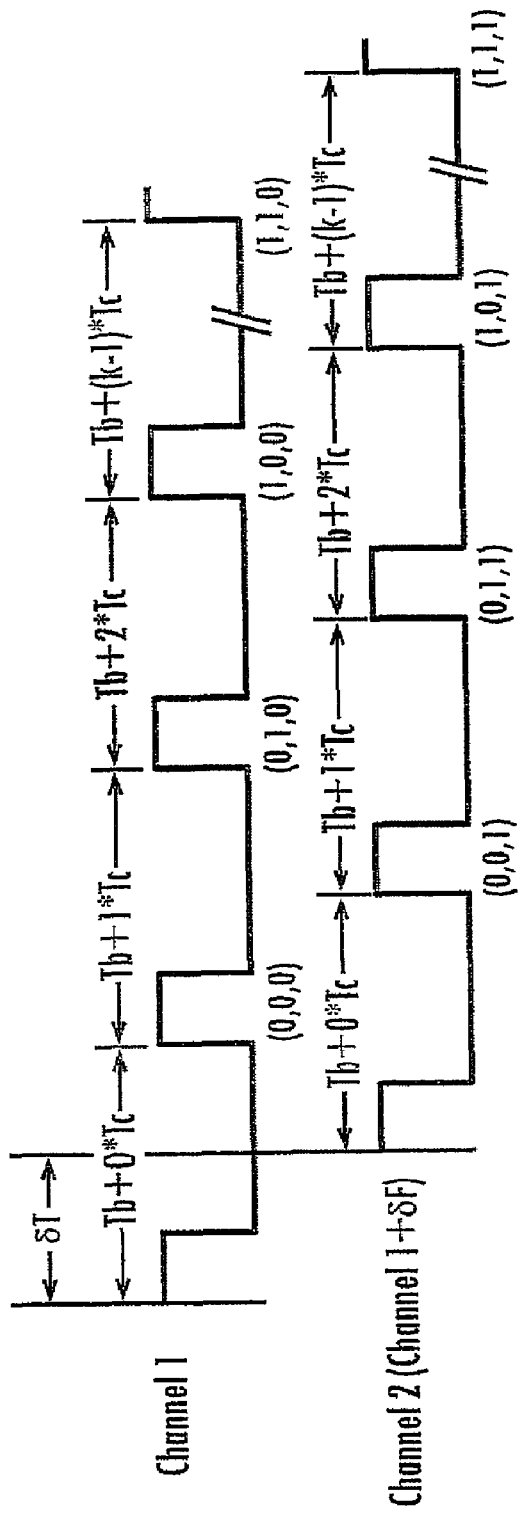
FIG. 3 is an illustration of a time domain view of the transmission scheme of an embodiment of the present invention.
Figure 4:
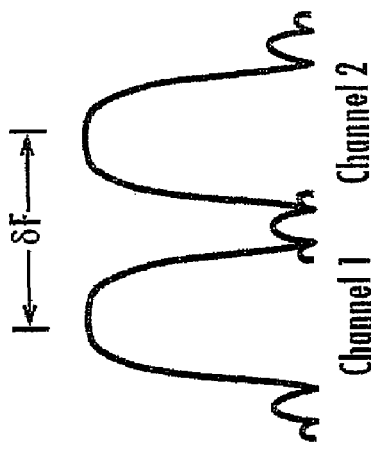
FIG. 4 is an illustration of a frequency domain view of the transmission scheme of an embodiment of the present invention.

FIGS. 3 and 4 respectively illustrate a time domain view and frequency domain view of amplitudes in an embodiment of a two-channel (e.g., channel 1 and channel 2) four ("K=4") time difference ("pulse position") FO-DPPM scheme for system 100 of the present invention. One skilled in the art will recognize that FIGS. 3 and 4 merely are intended to illustrate the principles behind FO-DPPM and are not intended to limit the scope of the present invention to this one embodiment.

One skilled in the art will recognize that the principles discussed in the four time difference FO-DPPM scheme also will apply to any FO-DPPM scheme including those with a smaller or larger number of time differences or FO-DPPM channels.

The time difference between the pulses in each channel of the FO-DPPM data stream typically is the sum of two segments: 1) a "blanking" time interval ("$T_b$") and 2) a "coding" time interval ("$T_c$"). The blanking time interval is used to minimize the sensitivity of the system 100 to interference (e.g., multipath propagation interference) by providing enough time between pulse signals to ensure that the interference has decreased enough to not affect the detection of the pulse position of the FO-DPPM signal. If the blanking time interval is too short, the interference within the signal will not be effectively minimized. If the blanking time interval is too long, bandwidth will go unused, thereby reducing the bandwidth efficiency of the system 100. The coding interval is used to encode a specific data value based upon time position of the FO-DPPM pulse. For example, depending upon the bit pattern, which the FO-DPPM pulse is intended to represent, the FO-DPPM pulse will be positioned at a specific time position within the set of possible time positions. Note that the "differential pulse position modulation" aspect of this scheme refers to the fact that the information is encoded only in the time difference between successive pulses. As such, an absolute time reference is not needed between any communicating nodes.

For the number ("K") of possible pulse positions ("symbols"), the time ("$T_{ensemble}$") to transmit the complete ensemble of all possible symbols is $(T_b+0*T_c)+(T_b+1*T_c)+(T_b+2*T_c)+(T_b+(K-1)*T_c)=K\ T_b+(K)(K-1)T_c/2$. Since all symbols are considered to be equally likely, the average time to transmit one symbol is the total time divided by the number ("K") of symbols. Thus, the average time to transmit one symbol is $T_{ensemble}/K=(K\ T_b+((K)(K-1)T_c/2))/K$; and the symbol rate ("Rs") in symbols/second is $R_s=K/(K\ T_b+((K)(K-1)T_c/2))$. Since one embodiment of the present invention is based upon a binary encoding scheme, the number of bits per symbol is $Log_2$ (K) bits per symbol. Thus, in a four pulse position (K=4) 4-DPPM channel, each pulse can represent a 2 bit symbol. In an eight pulse position (K=8) 8-DPPM channel, each pulse can represent a 3 bit symbol. Therefore, the average data rate ("$R_b$") in bits per second ("bps"), is the symbol rate ("$R_s$") multiplied by the bits per symbol (Log2 (K)). Thus, the average data rate ($R_b$) of a channel employing the K-DPPM scheme is $K\ Log_2\ (K)/(K\ T_b+((K)(K-1)T_c/2))$.

By implementing FO-DPPM scheme, which includes two frequency offset 4-DPPM channels, the data stream is modulated, such that each alternate pulse is transmitted on a different frequency channel, which is separated by frequency offset ("dF") and a time offset ("dT"). With two frequency channels, a time offset ("dT") is approximately equal to one half of $T_b$, thus the blanking time $T_b$ for each channel is effectively doubled in length of time. Therefore, the FO-DPPM scheme allows the blanking time $T_b$ to be reduced by half while still maintaining the same effective blanking time between DPPM pulses in the same channel. Thus, if a 150 ns blanking time $T_b$ was used for a single channel DPPM scheme to effectively dissipate the multipath propagation interference, FO-DPPM can effectively reduce $T_b$ to 75 ns. In an alternative embodiment, if an adaptive equalizer were be included within the receiver 225 to learn the nature of the multipath interference within the system 100 and compensate accordingly by adjusting $T_b$ on a dynamic basis, the blanking time $T_b$ could be even further reduced. For example, if at any moment during operation of the system 100, multipath interference was weaker, a smaller $T_b$ could be set to further increase the data rate of the system 100. In this alternative embodiment, blanking time $T_b$ could be reduced at times to as little as 50 ns to 25 ns.

In such a two channel 4-DPPM FO-DPPM system 100, the data rate is approximately 20 Mbs. However, by utilizing a higher order frequency offset format (e.g., 3 or 4 frequency 4-DPPM channels), the blanking time $T_b$ can be reduced by a factor of three or four from its original value, thereby increasing the achievable data rate even further (e.g. 30 or 40 Mbs). Further, if higher orders of pulse position are implemented, for instance 8-DPPM, in conjunction with higher orders of frequency offset, even higher data rates can be achieved. For example, if an 8-DPPM, 4 Frequency Offset system were implemented a 60 Megabit/second data rate would result.

Figure 5A:
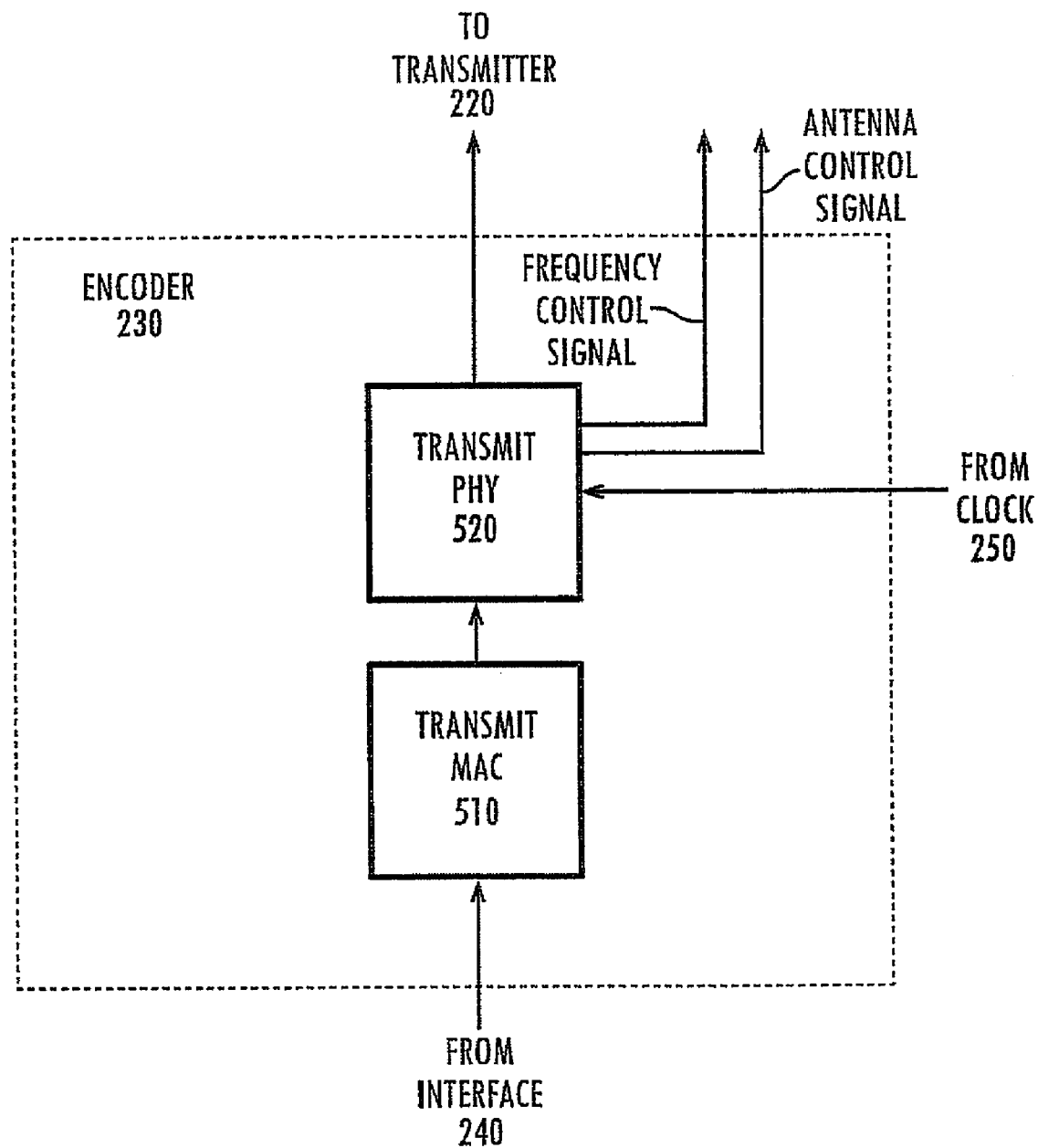
FIG. 5A is an illustration of a more detailed block diagram of an encoder of an embodiment of the present invention.
Figure 5B:
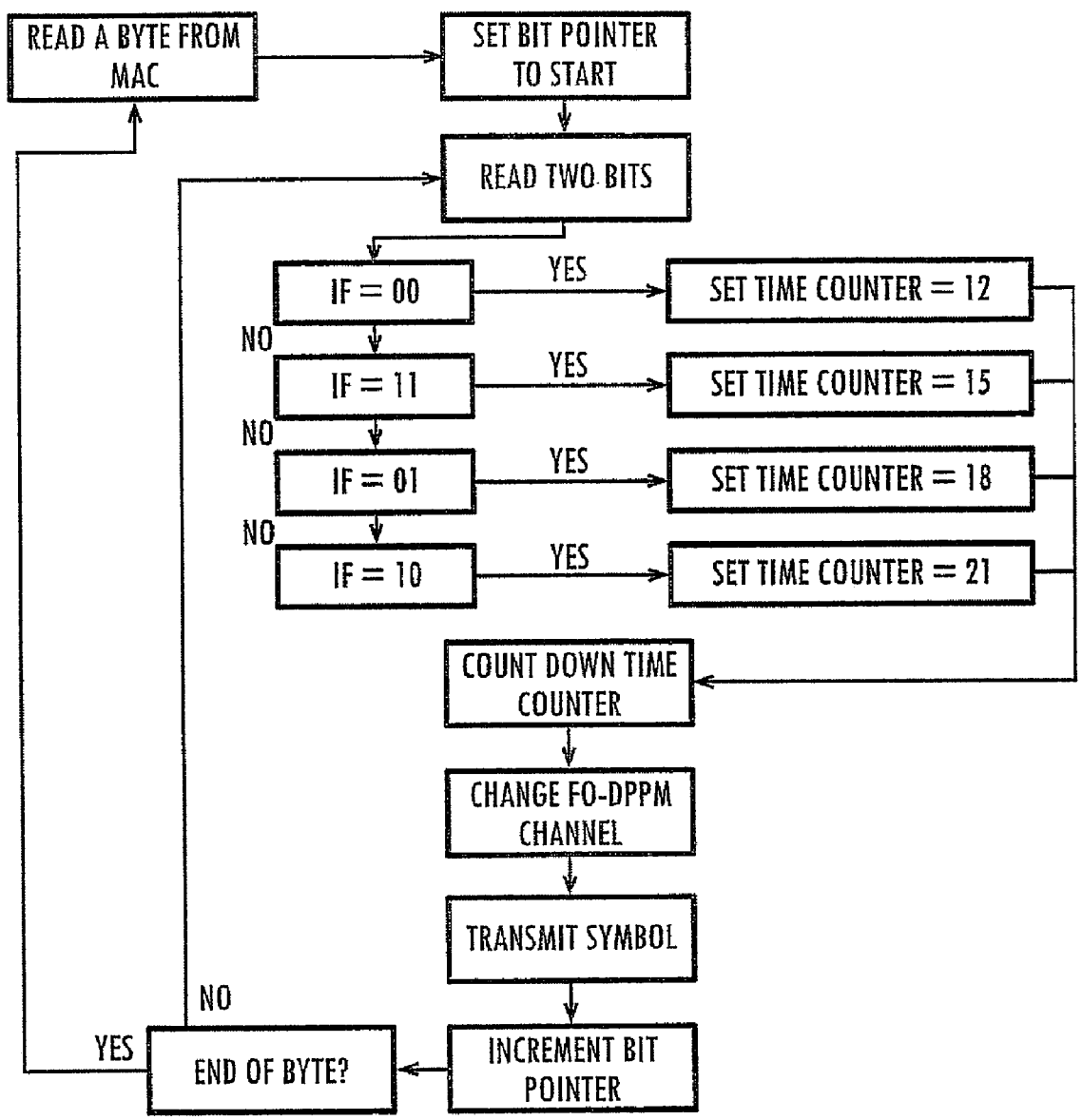
FIG. 5B is an illustration of a high level flow diagram of a method for converting from binary data signals to frequency offset differential pulse position modulation signals in an embodiment of the present invention.

FIG. 5A and 5B illustrates a more detailed block diagram of an encoder 230 and a flowchart of the conversion of binary data into FO-DPPM signals, respectively, of an embodiment of the present invention. To enable compatibility between different versions of FO-DPPM, a protocol version frame is appended onto the preamble of the first FO-DPPM data packet of each data stream. This protocol version frame allows the transmitter 220 of the computing device 105 to communicate to the receiver 225 of the receiving computing device 105 information, such as the number of frequency channels, which is being used in the current version of the FO-DPPM scheme that is being used.

Encoder 230 includes a transmit MAC ("tx_mac") module 510 and a transmit PHY ("tx_phy") module 520. The tx_mac module 510 implements the 4-DPPM protocol of an embodiment of the present invention. The tx_mac module 520 further provides programmability for network parameters. The tx_mac module 520 also implements the 3 phases of the data transmission, CSMA/CA/ACK. The tx_phy module 520 performs the 4-DPPM encoding and can be viewed as a slave to the tx_mac module 510 and the receive PHY ("rx_phy") module parameters.

The tx_mac module 510 includes:

Timer process which implements various system timers.

The transmit MAC state machine which implements the CSMA and CA phase of the transmission The Wait-for-Acknowledge state machine which implements the ACK phase of the transmission The ACK generation state machine which is embodied into the transmit MAC state machine Transmit Antenna diversity process CRC-32 generation block (per IEEE 802.3)

In addition, the tx_mac module 510 further includes the following various timers, which implement different components of the RF MAC:

Access-slot time timer. The concept of the access-slot time is based on the round trip delay between any sending and receiving pairs. This is a measurable unit in time based of the RF propagation delay and is programmable as the distance between the two unit increases. In a multi-node network this value has to be at the minimum the round trip delay between two sending and receiving pairs that are the farthest apart. This unit of time is used in randomizing the access to the airspace once the airspace becomes free. Since the nodes in the network are assumed to pick different number of time slots from the random number generator, they will hear each other within one time slot and the node who had the lowest number will force all other nodes to defer. The only chance for collision is if two nodes pick the same number from the random number generator. Access-slot value is programmable. This value gets loaded on the access-slot timer every time a slot needs to be timed.

Deferral counter. This is the count of the number of times the transmit-process defers before accessing the airspace. The maximum value for this counter is programmable.

Access-slot window counter. This window determines the maximum number of access-slots that a node can pick from the random number generator. This window is dynamically enlarged if the deferral counter grows. The starting value for this counter is programmable.

Retransmit counter. This counter keeps the count of retransmission. Packets are scheduled for retransmission every time an acknowledge frame is not received.

Free running random number generator.

Preamble counter. The number of preamble bytes is programmable. There is a one-to-one correspondence between this value and the programmable receive diversity preamble count window.

Figure 5C:
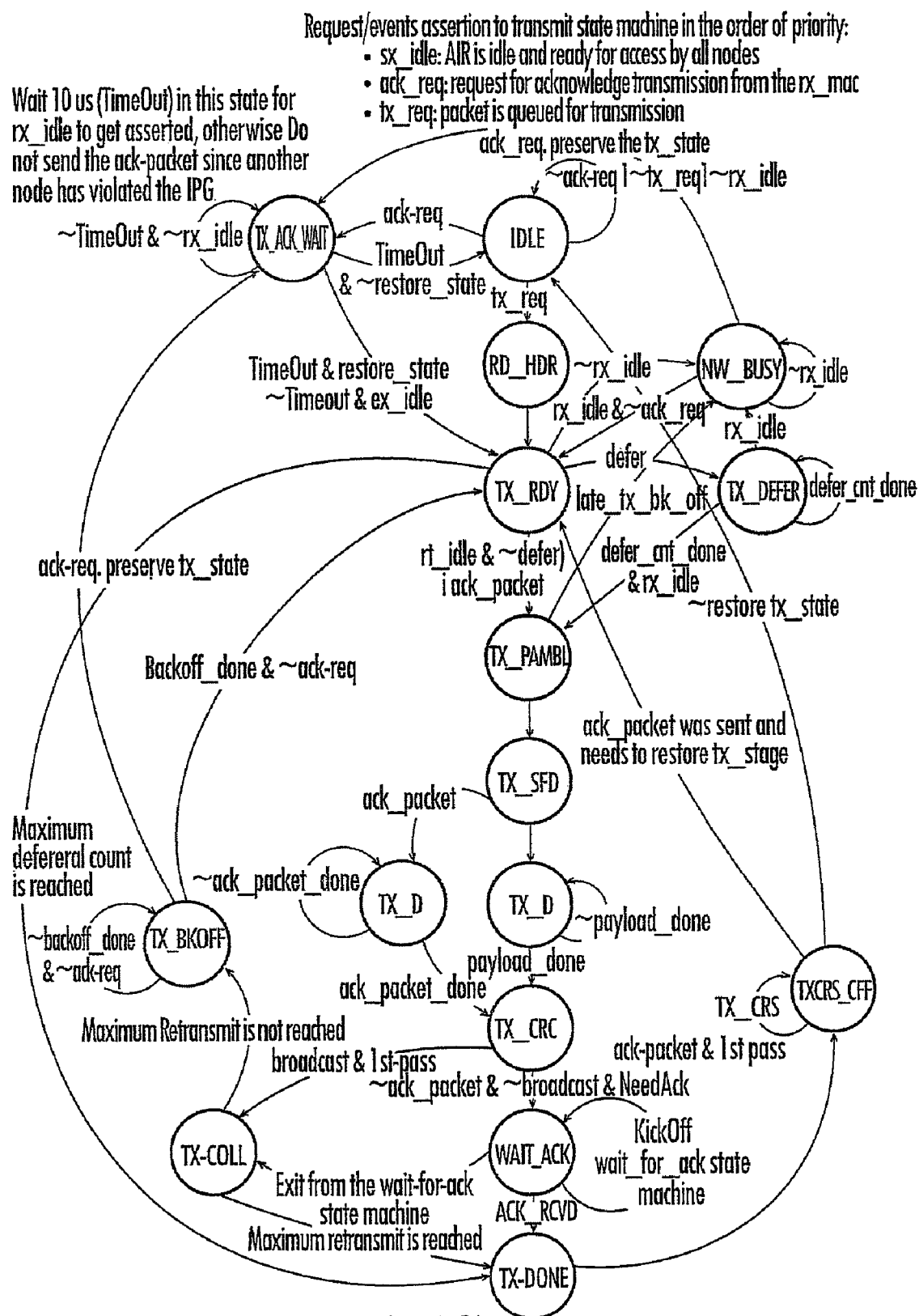
FIG. 5C illustrates a detailed block diagram of a transmit MAC state machine of an embodiment of the present invention.

FIG. 5C illustrates a detailed block diagram of a transmit MAC state machine of an embodiment of the present invention. A transition from IDLE is cased by the transmit buffer manager having data in its transmit queue and the airspace being available (as indicated by the rx_phy RX_IDLE signal). Here is a brief description of each state:

TX_RDY state: This is the state from which the transmit-process is launched. In this state a random number is drawn to see how many access-slot times the transmit-process has to wait (defer) before launching. The random number generation is used to implement the collision avoidance (CA) phase, which takes place in this state: A transition is made to TX_DEFER state if the number that is drawn is a non-zero number (which typically is the case since the number zero is reserved for the acknowledge packet). Also every time the deferral takes place a counter is incremented. The value of this counter is presented to the transmit buffer manager upon completion of the transit-process. The value of this counter also determines the largest number the transmit-process can draw from the random number generator. The value of this counter increases on average on a per packet transmission as the number of nodes in the network increases and thus causing an expansion of the randomization window on a per packet basis. Therefore, the deferral count is a good dynamic indicator of how busy the network is and as such the wait time for each node before accessing the air grows to minimize the collision probability.

If the deferral counter reaches a programmable maximum, the transmit-process no longer tries to access the network and exits the transmit-process. In this case the excess deferral bit in the transmit status filed also is set. If TX_RDY state is entered from other states, a transition is made to NW_BUSY state if the airspace is found to be busy. The transitions between the states TX_RDY, TX_DEFER, and NW_BUSY implement the CA phase of the wireless MAC.

TX_DEFER state: This is the state in which the transmit-process waits until its drawn deferral access-slots transpires. Following this state, if the airspace is not busy a transmission is launched by moving to the TX_PAMBL state. However if the airspace is found busy a transition to NW_BUSY is made.

NW_BUSY state: This state is reached from TX_DEFER or TX_RDY when the airspace is found to be busy. This state is also entered if a late reception is sensed as transmission is launched.

TX_PAMBL state: In this state the transmission is launched. The preamble character is transmitted a programmed number of times. As this state is entered, the tx_phy kickoff signal (TXENB) is asserted.

TX_SFD state: In this state, one byte of SFD is transmitted.

TX_D state: In this state, the payload is read from the transmit buffer manager and is transmitted.

TX_D_ACK state: This is a parallel state to TX_D state. The payload in this state is fixed and generated by the tx_mac process. The source and destination addresses in the acknowledge packet is popped from the receive MAC address stack in this state and sent along with the fixed header and the CRC-32 value.

TX_CRC state: In this state the 4 bytes of the CRC-32 value that is computed for the payload is transmitted.

WAIT_ACK state: In this state wait for acknowledge state machine is kicked off if the transmitted packet requires an acknowledge. This state is bypassed if the transmitted packet does not require an acknowledge or the packet is a multicast packet.

TX_COLL state: This state is reached if an acknowledge is not received. In this state a random number is drawn from the random number generator to determine how many collision-slot times the transmit-process has to wait before attempting to retransmit the packet. The collision-slot times are fixed to 50 µs. This number is chosen to be very close to IEEE 802.3 collision slot time. Multicast packets are sent twice by the tx_mac 510. This state is also entered if it is the first pass of the multicast packet transmission.

TX_BKOFF state: This is the actual wait state for the retransmit process. The transmit-process waits in this state the drawn number of collision-slot times before advancing to RX_RDY state. If during this waiting period, a request for an acknowledge transmission is received, this state is exited and an acknowledge packet transmission is scheduled. Once the acknowledge transmission is over, the TX_RDY state is entered with the previous counter and parameter values restored to the same values in the TX_BKOFF state.

TX_ACK_WAIT_IDLE state: This state is entered when an acknowledge needs to be transmitted. The transmit-process waits for the airspace to become available a fixed period of time in this state. The request for acknowledge transmission is received at the end of the reception process and as the IPG period is reached. Since the slot zero after the IPG is reserved for acknowledge transmission, a timeout counter is kicked off in this state. The airspace has to become free before this timeout counter expires (10 µs), which is usually the case. However if another party violates the IPG and starts transmitting, it is a moot point to send the acknowledge packet and cause collision. It also is unnecessary to transmit the acknowledge packet an arbitrary time into the future since the original sender waits for acknowledge to be returned for a fixed programmable period of times. If the packet is not received within a certain period of time it is assumed that either the acknowledge is lost or the responding party did not receive the original message (see wait-for-acknowledge state machine).

TX_DONE state: This is the state that issues the transmit status vector to the transmit buffer manager. Following this state the state IDLE is reached via the TXCRS_OFF state.

TXCRS_OFF state: This is a dummy state that is there to make sure TX_CRS is de-asserted before transmit-process moves to IDLE state. Since tx_phy module 520 is behind the tx_mac module 510 by almost a byte due to tx_phy and tx_mac pipelining, this state is needed to absorb the pipeline delay. Once the tx_mac module 510 moves to IDLE state, tx_phy module 520 also is free.

Figure 5D:
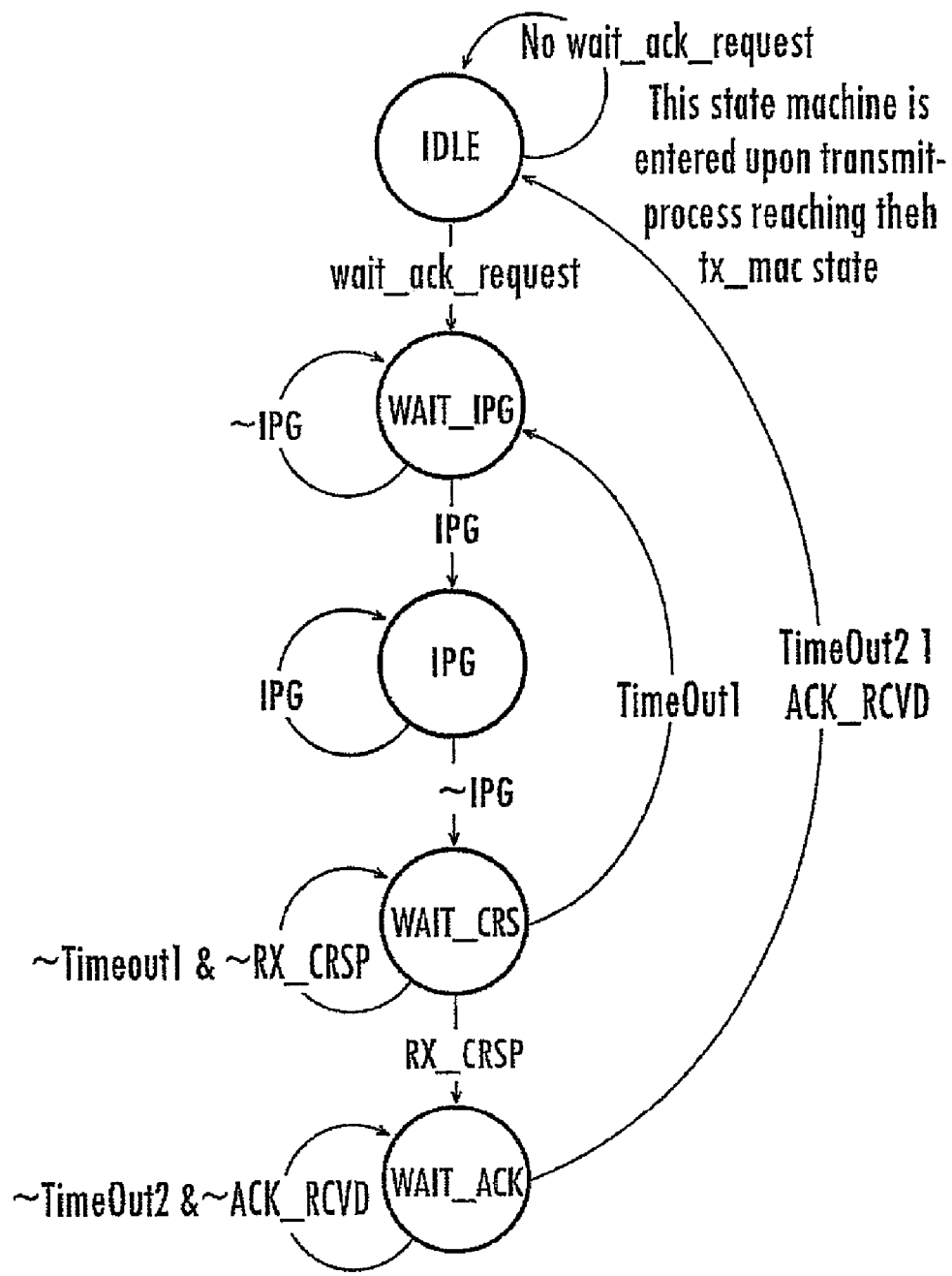
FIG. 5D illustrates a wait-for-acknowledge state machine of an embodiment of the present invention.

FIG. 5D illustrates a wait-for-acknowledge state machine of an embodiment of the present invention. The acknowledge handshake between the two communicating parties takes place within a specific time of the end of the transmission/ reception. In the transmit acknowledge direction the packet is sent out right after the IPG which will reach the communicating party no later than an access-slot time later. The waiting party for an acknowledgement waits a certain time (see the figure below) from the end of the IPG. Therefore, in the acknowledge transmit direction time if the airspace does not become available for 10 µs after the IPG, the acknowledge transmission is abandoned. In the acknowledge receive direction as the state machine below indicates, retransmission is scheduled if acknowledge packet is not received within a certain time frame.

WAIT_FOR_IPG state: This state is entered upon the end of transmission and is exited upon assertion of the LPG signal.

IPG state: This state is maintained until the IPG time is over.

WAIT_FOR_CRS: This state is entered upon negation of the IPG signal and is exited if CRS is not received within a time frame that is 2 times an access-slot time.

WAIT_FOR_ACK state: This state is entered upon reception of the RX_CRS signal and is exited upon either reception of the ACK_RCVD signal from rx_mac or a timeout from the ack-packet-length timer. The ack-packet-length timer corresponds to the time it takes to transmit the longest preamble byte count plus the 20-byte acknowledge packet. This time is measured from the assertion of the RX_CRS. ACK_RCVD should be asserted during this time period.

Transmit Diversity process. The transmit diversity process determines the antenna. The antenna value parks on the last transmit antenna value. During the receive, the rx_phy module 610 can toggle this value through the receive diversity state machine. Every time the antenna is switched an AGC_DIS is asserted to the Radio and the subsequent pulses are masked off by the rx_phy module 610 for a period of 2.775 µs (2.5 µs per radio specification+one symbol time). Here is the step by step choice for the antenna value Upon transmission kickoff the value programmed by the software is driven onto the antenna.

If the transmission is for an acknowledge packet, the value received from rx_phy module 610 is driven onto the antenna. Note that as soon as the reception is over, the antenna switches back to its previous transmission state, therefore for acknowledge packet transmission, the value remembered in the rx_phy module 610 and passed on to the tx_mac 520. Antenna switch if it happens at the end of the reception for which an acknowledge needs to be sent is unnecessary. Future transmit diversity algorithms should remedy this. Antenna switch if it happens between back to back reception with or without acknowledge is also unnecessary. Future transmit diversity algorithms should remedy this.

Every time a retransmit is scheduled the antenna value is toggled from its previous value.

For broadcast packets the antenna selected is forced to the value '0' for the first transmit pass and to the value '1' for the second transmit pass.

Transmit Phy ("tx_phy") module 520 includes the transmit encoder and the AGC block. The transmit encoder process loads a byte from tx_mac module 510 onto a parallel to serial converter. The byte is examined 2-bit at a time and a down counter is preloaded with the following values:

12 for the Symbol 00
15 for the Symbol 11
18 for the Symbol 01
21 for the Symbol 10

The counter then runs until it reaches 0 at which time a pulse is generated. This process continues until all bytes are transmitted. The tx_phy module 520 makes no assumption about the preamble value, the start-of-frame delimiter or the payload type. It simply performs 4-DPPM encoding on the bytes received from tx_mac module 510.

The AGC block primary function is to assert the AGCDIS_ signal to the Radio. It asserts AGCDIS_upon detecting one of the following conditions. This signal is pulsed for approximately 300 ns and driven to radio in the following cases:

At the end of receive process (RX_EOF)
At the end of the transmit process (TX_EOF)
When antenna switches The AGC block also drives the antenna value to the Radio. The antenna value is the tx_mac value except for duration of RX_CRS. During RX_CRS rx_phy can switch antenna value by asserting TOGGLE_ANT which is driven from its receive diversity state machine.

Figure 6A:
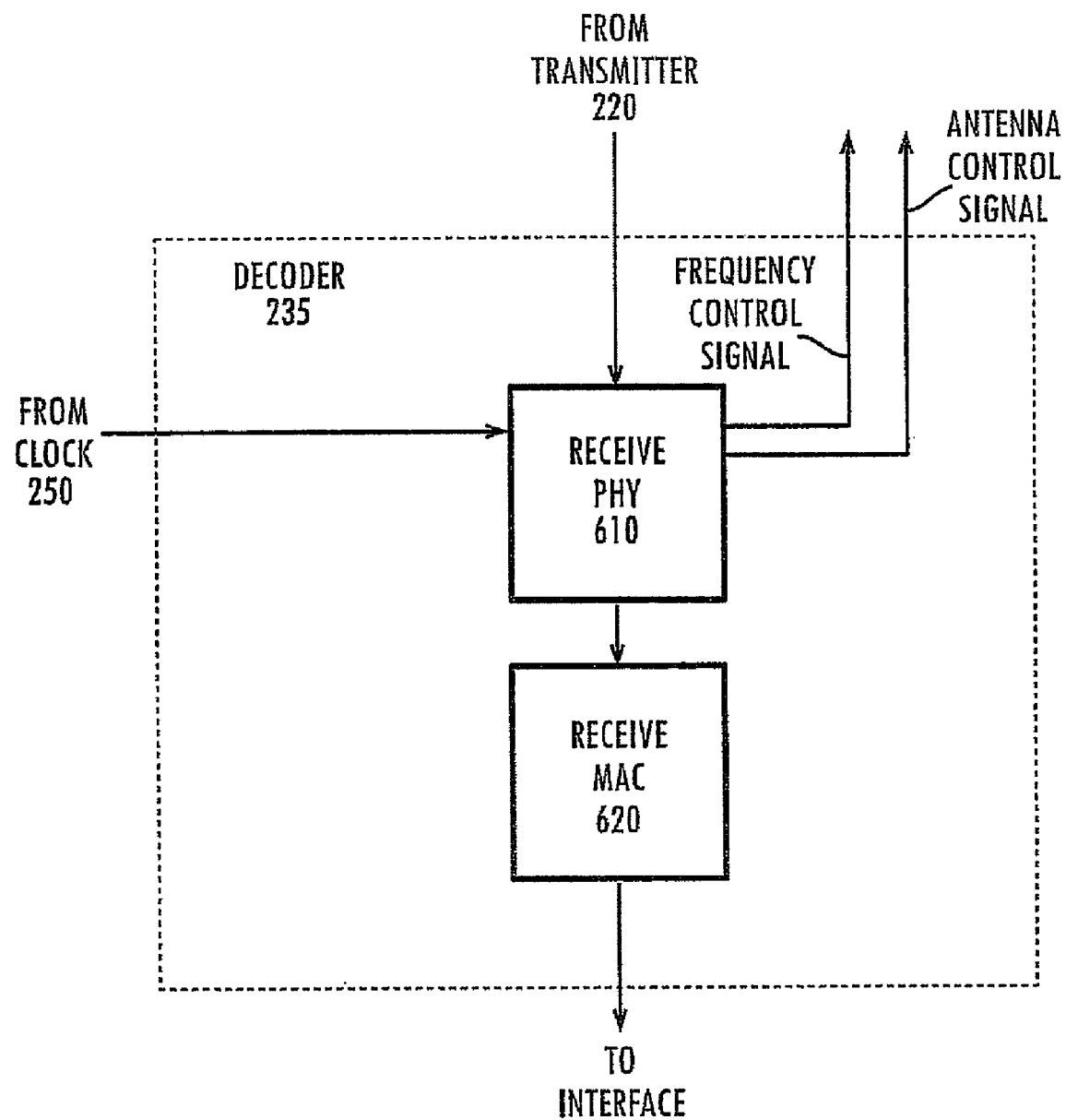
FIG. 6A is an illustration of a more detailed block diagram of an encoder of an embodiment of the present invention.
Figure 6B:
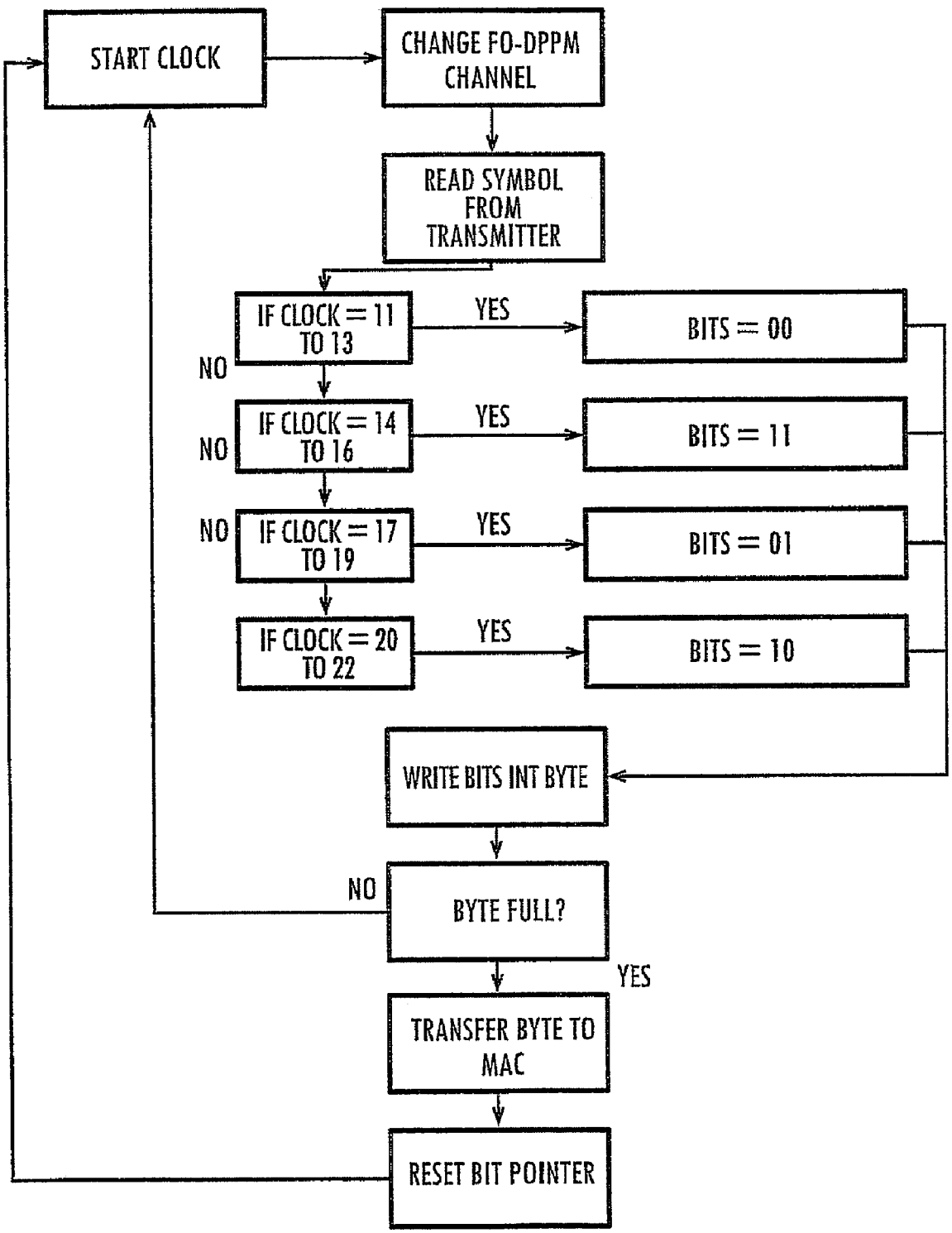
FIG. 6B is an illustration of a high level flow diagram of a method of converting from frequency offset differential pulse position modulation signals to binary data signals in an embodiment of the present invention.

FIGS. 6A and 6B illustrate a more detailed block diagram of the decoder 235 and a flowchart of the conversion of FO-DPPM signals into binary data, respectively, of an embodiment of the present invention.

Decoder 235 includes a receive PHY ("rx_phy") module 610 and a receive MAC ("rx_mac") module 620. The parameters of the receive PHY ("rx_phy") module 610 are coupled with the radio behavior. The receive MAC ("rx_mac") module 620 converts serial data to parallel and stores the IEEE 802.3 source and destination addresses for acknowledge packet transmission.

Receive MAC ("rx_mac") module 620 receives serial data from the rx_phy module 610 and converts the serial data into parallel data before sending the data to receive buffer manager. Receive MAC also stores the Ethernet source and destination address fields for the acknowledge transmission. The address filtering is performed in the receive buffer manager. rx_mac module 620, however, detects that a received packet needs an acknowledgement reply and sends the request for acknowledge transmission to the tx_mac module 510.

Figure 6C:
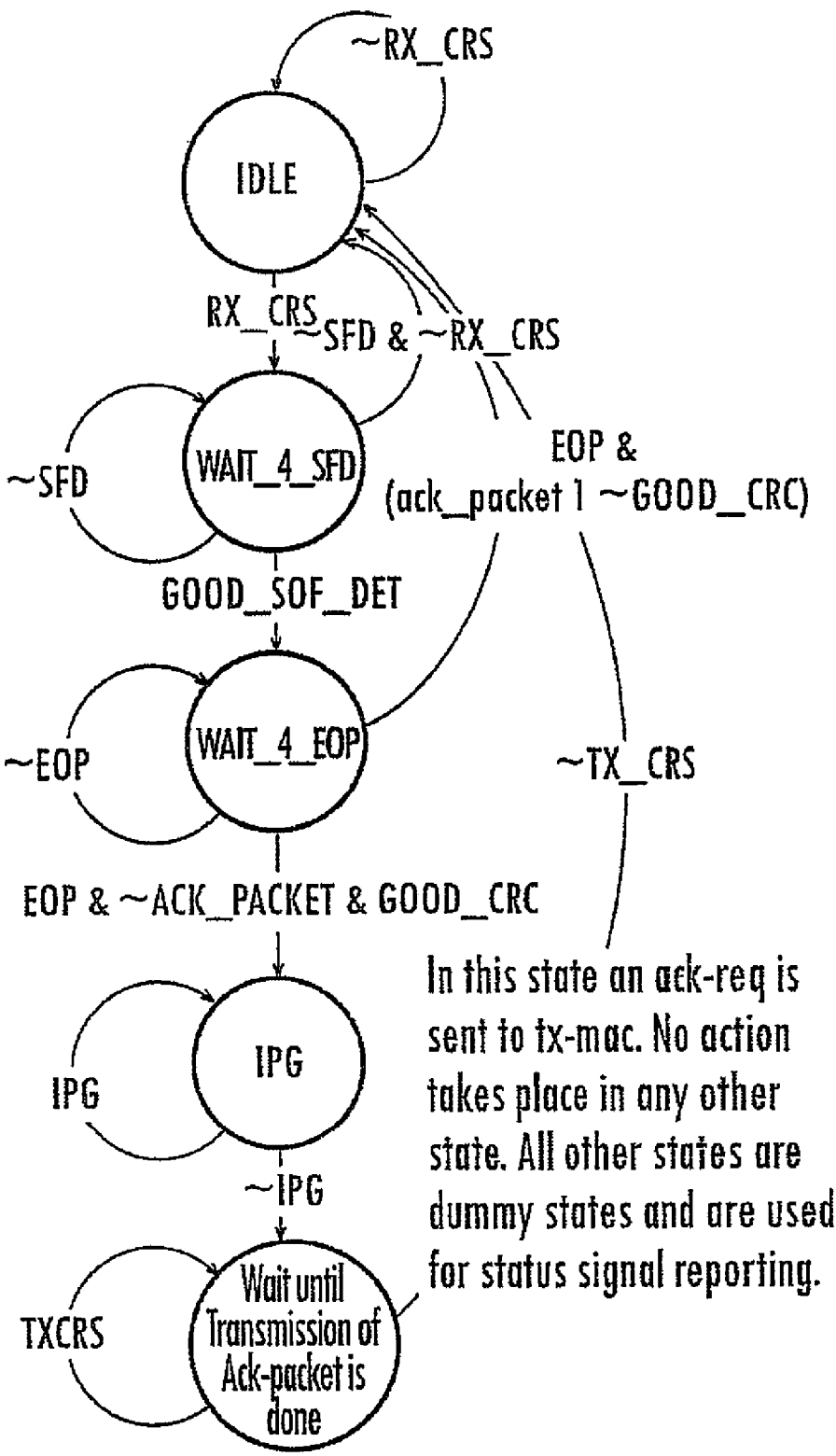
FIG. 6C illustrates the receive MAC state machine of an embodiment of the present invention.

FIG. 6C illustrates the receive MAC state machine of an embodiment of the present invention. The receive MAC state machine is initiated when start-of-frame delimiter is detected. The state machine is exited when the last indication is received from the rx_phy module 610 when the received packet does not need an acknowledge reply or when the acknowledge packet has been transmitted. No specific actions take place anytime during any state. In addition to the state machine reporting status on the signal rx_busy, the state machine also generates the ack_req in the state IPG.

Receive PHY ("rx_phy") module 610 includes the diversity state machine and numerous counters to assist in timing different relative events. The principal basis of rx_phy operation is the detection of the Carrier Sense (RX_CRS). Unlike the wire-line detection of RX_CRS, which is the presence of energy on the wire, RX_CRS is detected through sampling of received pulses from the Radio. Several timers and counters are include within the rx_phy module 610 to measure the inter-pulse periods for symbol decoding and various symbol arrival order and arrival time intervals. Through these measurements the Carrier Sense is detected. A signal that is received by the rx_phy module 610 may be quite distorted from its original from due to multi-path and fading effects. To have a robust reception, rx_phy module 610 chooses the correct antenna, which provides the best reception, and make a few assumptions about the nature of received traffic. Further it has to deal with the nodes that are outside of the Carrier sense domain and do not necessarily synchronize to other nodes transmission. rx_phy module 610 has to be aware of the Radio parameters such as AGC stabilization time to mask off reception during AGC stabilization periods. Therefore, the timer and counters within rx_phy module 610 are utilizes to assist in reception or rejection of received frames. The receive diversity algorithm also is dependent on AGC stabilization time since upon antenna switch, the receive diversity state machine will mask off reception until the AGC stabilization period is over.

Figure 6D:
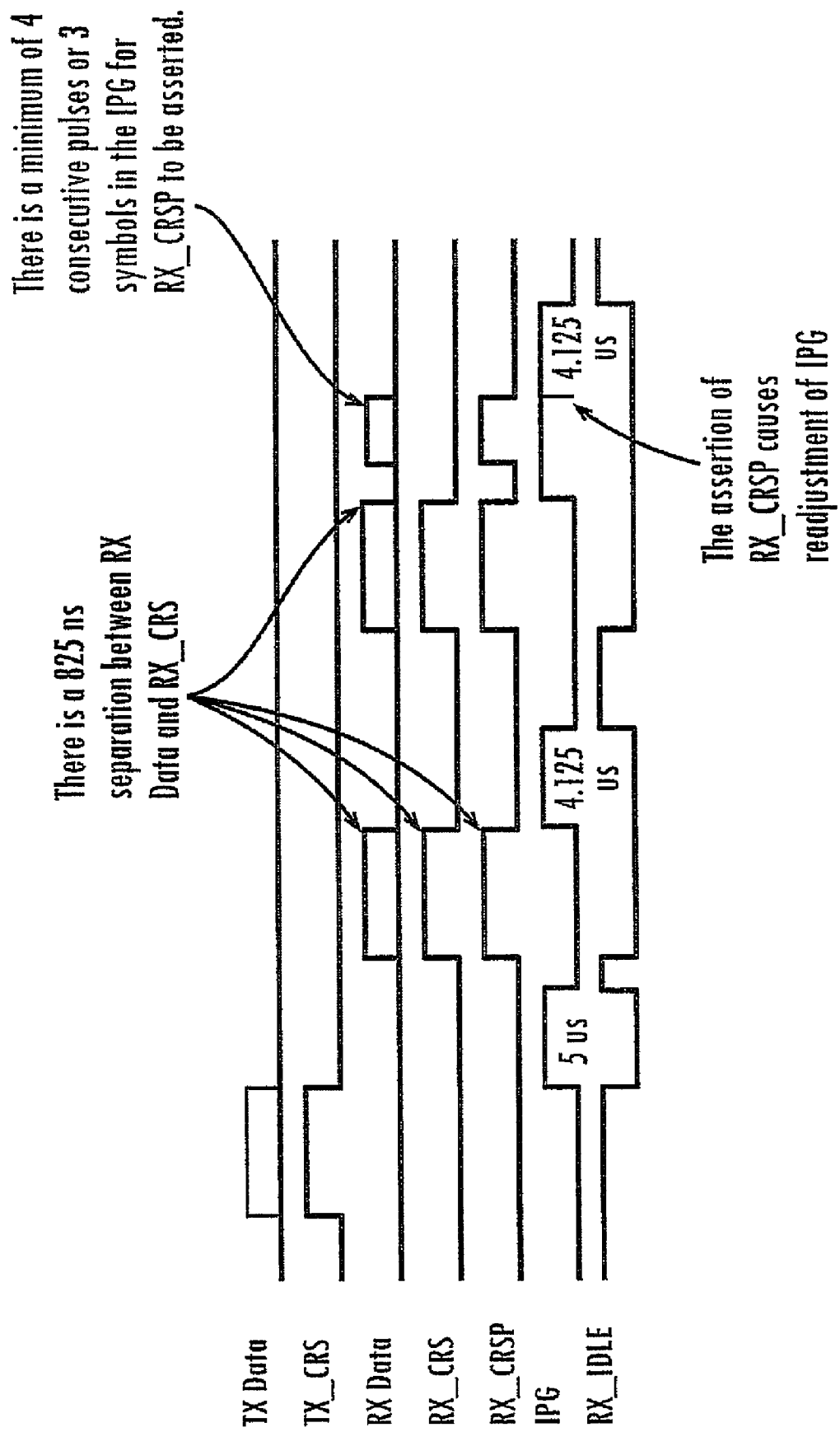
FIG. 6D illustrates the timer processes, such as rx_phy timers and counters, which determine the AGC stabilization time, the IPG time, and inter-pulse timer of an embodiment of the present invention.

FIG. 6D illustrates the timer processes, such as rx_phy timers and counters, which determine the AGC stabilization time, the IPG time, and inter-pulse timer of an embodiment of the present invention. The following is the list of some of the timers that are included within the rx_phy module 610.

- IPG timer, (which is a 5 μs from the end of TX_CRS or 4.125 μs from the end reception).
- Inter-pulse timer, which determines the symbol type. The inter-pulse timer counts the number of 80 MHz clock ticks and based on the count determines the symbol type or a symbol error. Symbol error is indicated if no pulse is received within 275 ns of the last received pulse. When a pulse is detected and the inter-symbol timer starts, all incoming pulses are masked of for the next 10 clock ticks (125 ns) and the 4-ppm decoding starts after 125 ns has elapsed from the first detected edge.
  - Symbol 00 range (137.5-162.5 ns, 11-13 clocks).
  - Symbol 11 range (175-200 ns, 14-16 clocks).
  - Symbol 01 range (212.5-237.5 ns, 17-19 clocks).
  - Symbol 10 range (250-275 ns, 20-22 clocks).
- Every time a pulse is detected, the symbol decode clock counter is reset, thus input jitter and wander are not built up. The jitter allowed on reception of each symbol is +/−12.5 ns.
- End of reception timer. This is an 825 ns period from the last pulse reception in which no pulse is received. End of reception is indicated upon the timer reaching this value.
- HOLD_OFF_signal assertion timer. This timer asserts HOLD_OFF_signal 1.8 μs after reception of the first pulse.
- AGC stabilization period timer. This timer is activated upon detection of AGCDIS_signal. When this signal is asserted the data received during the AGC stabilization time (maximum of 2.5 μs per Radio specification) can be ignored. rx_phy module 610 can mask the incoming data for 2.775 μs which is 2.5 μs plus 1 symbol time (maximum of 275 ns). Following AGC stabilization period, a pulse is received in 287.5 ns for receive diversity to start preamble decoding. If no pulse is received in 287.5 ns, a symbol error is indicated and antenna switching takes place. Following the 1$^{st}$ antenna switch, another AGC stabilization period is observed after which the data is being received and no further antenna switch takes place. No more than one TOGGLE_ANT is issued to the AGC block (see antenna diversity state machine for more details).
- Receive diversity sample size down counter. This counter is preloaded with the programmed value. If upon reaching the count of Zero no symbol error has been detected, the receive diversity state machine does not switch antenna Every time the airspace is not busy and subsequently a pulse is received this counter gets preloaded with the programmed value.
- TX_CRS extension timer. This timer extends the TX_CRS by 300 ns.
- Pulse counter during IPG. This counter counts consecutive received pulses during the IPG. 4 consecutive pulses during IPG asserts the RX_CRSP which in turn causes adjustment to the IPG. These consecutive pulses are considered to be valid reception and as a result, the IPG is measured from the end of this newly asserted RX_CRSP (825 ns+4.125 μs). The sole reason for the assertion of RX_CRSP and existence of RX_CRSP plus is to adjust the IPG in case of a fade-out. In all other cases RX_CRS and RX_CRSP typically are the same.

Figure 6E:
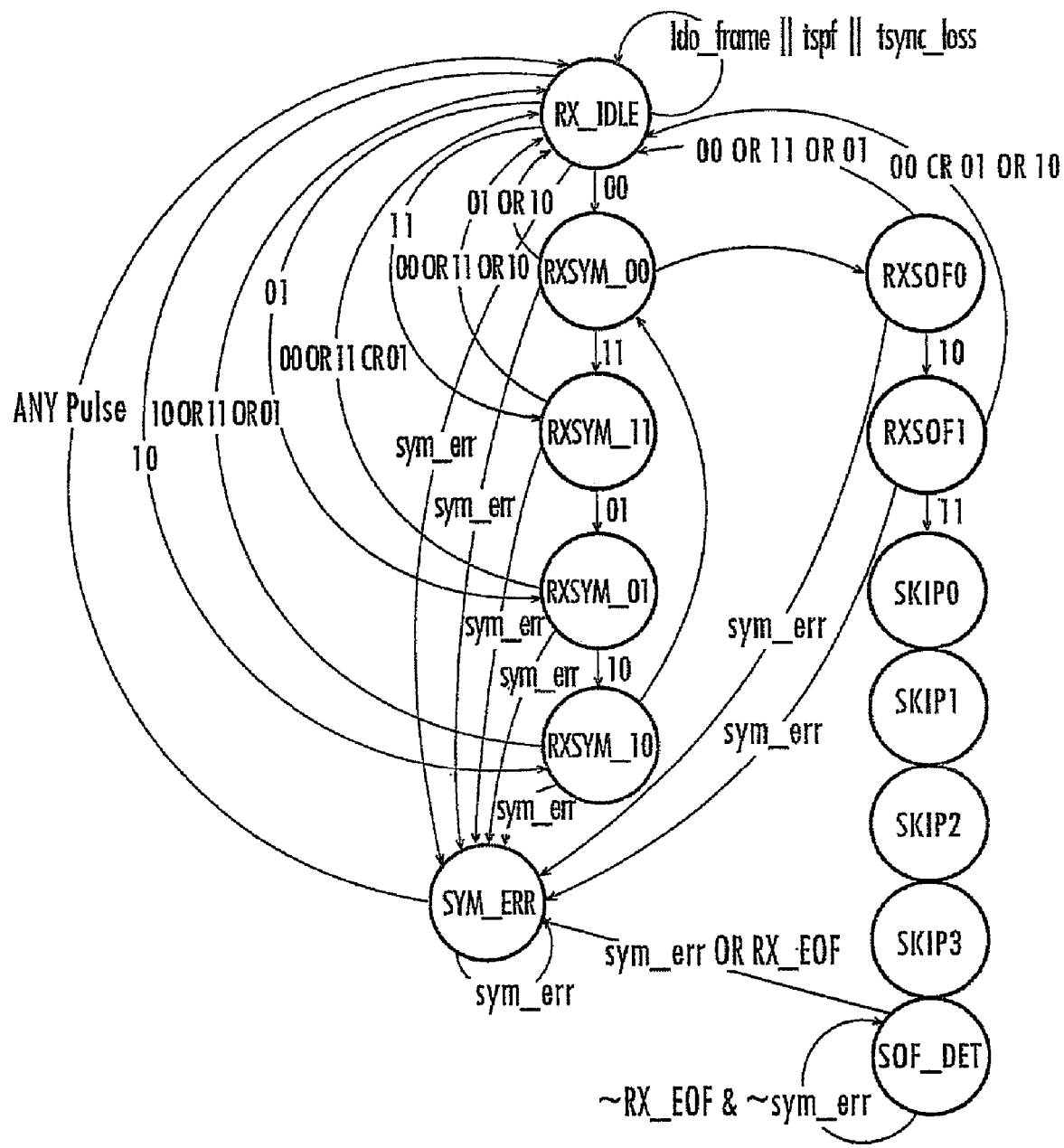
FIG. 6E illustrates the receive diversity state machine of an embodiment of the present invention.

FIG. 6E illustrates the receive diversity state machine of an embodiment of the present invention. The receive diversity state machine follows the expected sequence of 00,11,01,10 symbols (from left to right). If this sequence is not received within the diversity sample size window, antenna is switched and an AGC attack time is waited before receiving further symbols. Note that Start of frame delimiter symbol is 00,00, 10,11 (from left to right).

To further illustrate the two frequency channel FO-DPPM scheme of an embodiment of the present invention, the following example of the transmission and receipt of FO-DPPM signals between computing devices 105A and 105B now will be discussed. Computing device 105A initiates the transmission of data to computing device 105B by transmitting binary data from computing device 105A to interface 240A of transceiver 107A. Encoder 230A receives the binary data from computer 105A via interface 240A. The encoder 230A transmits the electrical version of FO-DPPM signal to transmitter 220A where the transmitter converts the signal to an RF format and transmits with the antenna array 210 the first pulse of the FO-DPPM signal on channel 1. The transmitter 220A then waits a predetermined interval, which is less than $T_b$ and transmits on antenna array 210 a second FO-DPPM pulse on channel 2. After transmitting the pulse on channel 2, transmitter 220A switches back to channel 1 and transmits, after a predetermined interval of time, the next FO-DPPM pulse of the current data stream. The transmitter 220A continues to switch back and forth consecutively between the two channels until the transmission of the data stream is complete. Separate time interval clocks are maintained for each channel to decode the two separate symbol streams. By multiplexing the transmitted data stream such that odd numbered symbols are transmitted on one channel (e.g., channel 1) and even numbered symbols are transmitted on the other channel (e.g., channel 2), the effective data throughput can be increased by the number of channels employed. For example, by utilizing two channels, the throughput of the system 100 is double that of a single frequency channel FO-DPPM scheme.

Receiver 225B receives the FO-DPPM data stream by starting on channel 1 and receiving via the antenna array 210B the first FO-DPPM pulse. This pulse will assist the receiver 225B determine which version of the FO-DPPM scheme the FO-DPPM pulse is related, thereby allowing the receiver 225B to adjust to the number of frequency channels used in this version of the FO-DPPM scheme. Since in our example the FO-DPPM scheme uses only two frequency channels, the receiver 225B will detect that this version is using only two channels and, therefore, will begin to alternate between the two frequency channels in order to detect the pulse positions of the FO-DPPM data stream.

The foregoing description of embodiments of the present invention has been presented for purposes of illustration and description. It is not intended to be exhaustive nor to limit the invention to the precise form disclosed. Many modifications and variations are possible in light of the above teaching. For example, the number of frequency channels and time differences can be increased or decreased depending upon the amount of throughput needed for the system 100. In addition, various protocols can be used with the FO-DPPM scheme. Embodiments were chosen and described to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What is claimed is:

1. A method for controlling access to a medium comprising:
   (a) determining a first transmit time for a packet on a transmission medium based on a non-zero number selected from a random number generator;
   (b) at the determined first transmit time, sensing traffic on said transmission medium;
   (c) if said transmission medium is available, transmitting the packet; and
   (d) if said transmission medium is not available, deferring a transmission of the packet to a second transmit time using a second non-zero number selected from the random number generator.

2. The method of claim 1, wherein said second transmit time is further based at least in part on an Inter Packet Gap time.

3. The method of claim 1, further comprising counting a number of instances said transmission of the packet is deferred and deferring said transmission until the number of instances said transmission is deferred reaches a threshold value.

4. The method of claim 3 further comprising:
   terminating attempts to transmit the packet based, at least in part, on the number of instances of said transmission reaching said threshold value.

5. The method of claim 1
   wherein said second transmit time is further based at least in part on a back-off process in response to said deferral of transmission.

6. The method of claim 1
   wherein said second transmit time is further based at least in part on multiplying the second non-zero number by a programmable access-slot time.

7. The method of claim 6 wherein the programmable access-slot time is determined based on a round trip delay time between any sending and receiving pair of nodes accessing the transmission medium.

8. The method of claim 6
   wherein the programmable access-slot time includes a transmit turn-on time.

9. The method for of claim 1, wherein a maximum number selectable from the random number generator is determined based on a counter of a number of instances said transmission of the packet is deferred.

10. The method of claim 5
    wherein the back-off process is a linear back-off process.

11. The method of claim 1, further comprising repeating (b)-(d) with the second transmit time as the determined first transmit time.

12. An apparatus comprising:
    a transmit media access control module configured to
    (a) determine a first transmit time for a packet on a transmission medium based on a non-zero number selected from a random number generator;
    (b) at the determined first transmit time, sense traffic on said transmission medium;
    (c) if said transmission medium is available, trigger transmission of the packet by a transmitter; and
    (d) if said transmission medium is not available, defer transmission of the packet to a second transmit time using a second non-zero number selected from the random number generator.

13. The apparatus of claim 12, wherein said second transmit time is further based at least in part on an Inter Packet Gap time.

14. The apparatus of claim 12, further comprising counting a number of instances said transmission of the packet is deferred and deferring said transmission until the number of instances said transmission is deferred reaches a threshold value.

15. The apparatus of claim 14, wherein said transmit media access control module is further configured to terminate attempts to transmit the packet based, at least in part, on the number of instances of said transmission reaching said threshold value.

16. The apparatus of claim 13, wherein said
    second transmit time is further based at least in part on a back-off process in response to said deferral of transmission.

17. The apparatus of claim 12 wherein said second transmit time is further based at least in part on multiplying the second non-zero number by a programmable access-slot time.

18. The apparatus of claim 17 wherein the programmable access-slot time is determined based on a round trip delay time between any sending and receiving pair of nodes accessing the transmission medium.

19. The apparatus of claim 17, wherein the programmable access-slot time includes a transmit turn-on time.

20. The apparatus of claim 12 wherein a maximum number selectable from the random number generator is determined based on a counter of a number of instances said transmission of the packet is deferred.

21. The apparatus of claim 16 wherein said back-off process is a linear back-off process.

22. The apparatus of claim 12, further comprising repeating (b)-(d) with the second transmit time as the determined first transmit time.

* * * * *

UNITED STATES PATENT AND TRADEMARK OFFICE
CERTIFICATE OF CORRECTION

| | | |
|---|---|---|
| PATENT NO. | : 7,609,712 B2 | Page 1 of 1 |
| APPLICATION NO. | : 11/504967 | |
| DATED | : October 27, 2009 | |
| INVENTOR(S) | : John B. Langley et al. | |

It is certified that error appears in the above-identified patent and that said Letters Patent is hereby corrected as shown below:

IN THE CLAIMS

Claim 9, Column 15, Line 47:

Delete "for" after the word "method"

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,609,712 B2
APPLICATION NO. : 11/504967
DATED : October 27, 2009
INVENTOR(S) : Langley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 382 days.

Signed and Sealed this

Twelfth Day of October, 2010

David J. Kappos
*Director of the United States Patent and Trademark Office*